United States Patent [19]

Clevenholm et al.

[11] 4,395,133

[45] Jul. 26, 1983

[54] COOKING APPARATUS HAVING A STIRRING DEVICE

[75] Inventors: Roy L. R. Clevenholm, Staffanstorp; Carl-Olof H. Mellqvist, Helsingborg, both of Sweden

[73] Assignee: Landskrona Finans AB, Landskrona, Sweden

[21] Appl. No.: 301,585

[22] Filed: Sep. 14, 1981

[30] Foreign Application Priority Data

Sep. 25, 1980 [SE] Sweden ............................... 8006705

[51] Int. Cl.³ ............................................. B01F 7/32
[52] U.S. Cl. ...................................... 366/241; 99/348
[58] Field of Search ................. 99/348; 366/241, 242, 366/244, 245, 247, 249, 252, 279, 253, 261, 281, 282, 185, 189, 194, 195, 196

[56] References Cited

U.S. PATENT DOCUMENTS

| | | | |
|---|---|---|---|
| 695,330 | 3/1902 | McCaslin | 366/241 |
| 2,477,416 | 7/1949 | Page | 99/348 |
| 2,591,601 | 4/1952 | Peters | 99/348 |
| 2,753,158 | 7/1956 | Rebechini | 99/348 |
| 3,315,947 | 4/1967 | Nauta | 99/348 |
| 3,691,938 | 9/1972 | Nichols | 99/348 |
| 3,739,710 | 6/1973 | Hubbert | 99/348 |
| 4,199,266 | 4/1980 | Glusti | 99/348 |

FOREIGN PATENT DOCUMENTS 448644  8/1927  Fed. Rep. of Germany.

*Primary Examiner*—Robert W. Jenkins
*Attorney, Agent, or Firm*—Holman & Stern

[57] ABSTRACT

A simple dismountable driving arrangement for a stirring device of a cooking vessel, comprises a driving motor mounted at the outside of the vessel, or on a heating jacket surrounding the vessel. The stirring device may be of arbitrary shape and has a center shaft, which by means of a quick coupling is connectable to an angular gearing mounted in the hub of a supporting cross, the arms of which extend to the side-wall of the vessel and are attached thereto by means of bayonet-couplings. At the bottom, the stirring device is guided by a conical center stud. Between the primary gearing and the angular gearing a horizontal shaft extends immediately above the top edge of the vessel. The shaft is connected to the gearings by means of quick couplings.

2 Claims, 2 Drawing Figures

COOKING APPARATUS HAVING A STIRRING DEVICE

BACKGROUND OF THE INVENTION

Field of the Invention

This invention relates to cooking vessels and stirring apparatus therefore for large scale cooking and similar uses.

When cooking in large scale kitchens almost all stiring in the vessels is carried out manually by paddles. There are, or have been mechanical stiring devices where the driving unit is placed outside the vessel and the power is transferred to the tools by a flexible or rigid shaft. This implies that the cover of the vessel always has to be removed, which firstly means evaporation from the product and secondly very bad working conditions, with heat and moisture being injected into the atmosphere of the premises. In addition most cooking appliances are tiltable, and during tilting no stiring can take place. Many dishes are self-sedimentating, which means that it will be difficult to serve uniform portions.

The object of the present invention is to propose an arrangement at the stiring mechanism, which firstly allows the use of a cover, secondly may be so applied that, when necessary, the vessel may be tilted without effecting the driving mechanism, and which also is easily dismountable for cleaning the vessel and the stirring device.

Summary of the Invention

A cooking vessel according to the invention is characterized by a supporting construction for the stirring device comprising a center stud at the bottom of the vessel and a supporting cross for a vertical centre shaft of the stirring device, mountable at the top edge of the vessel, and a primary gearing at the driving motor and an angular gearing at the end of the stirring device shaft extending through the support cross, the gearings being so arranged that a horizontal shaft interconnecting said gearings may pass immediately above the top edge of the vessel.

The horizontal shaft is preferably connectable to the gearings by quick disconnect couplings, and the arms of the supporting cross are preferably connectable to the inner wall of the vessel by bayonet-couplings. The shaft of the stirring device is preferably connectable to the angular gearing by a quick disconnect coupling located below the support cross.

The stirring device preferably consists of a U-shaped frame having horizontal cross bars, and the center stud is conical and co-operates with a corresponding recess in the lower part of the U-shaped frame. Other stirring agitators, which have proved suitable are propellers having lifting or pushing down action, wisks, turbines and double-cone mixers.

BRIEF DESCRIPTION OF THE DRAWINGS

The invention will be described in more detail below with reference to the accompanying drawings, wherein.

DESCRIPTION OF PREFERRED EMBODIMENTS

Figure 1:
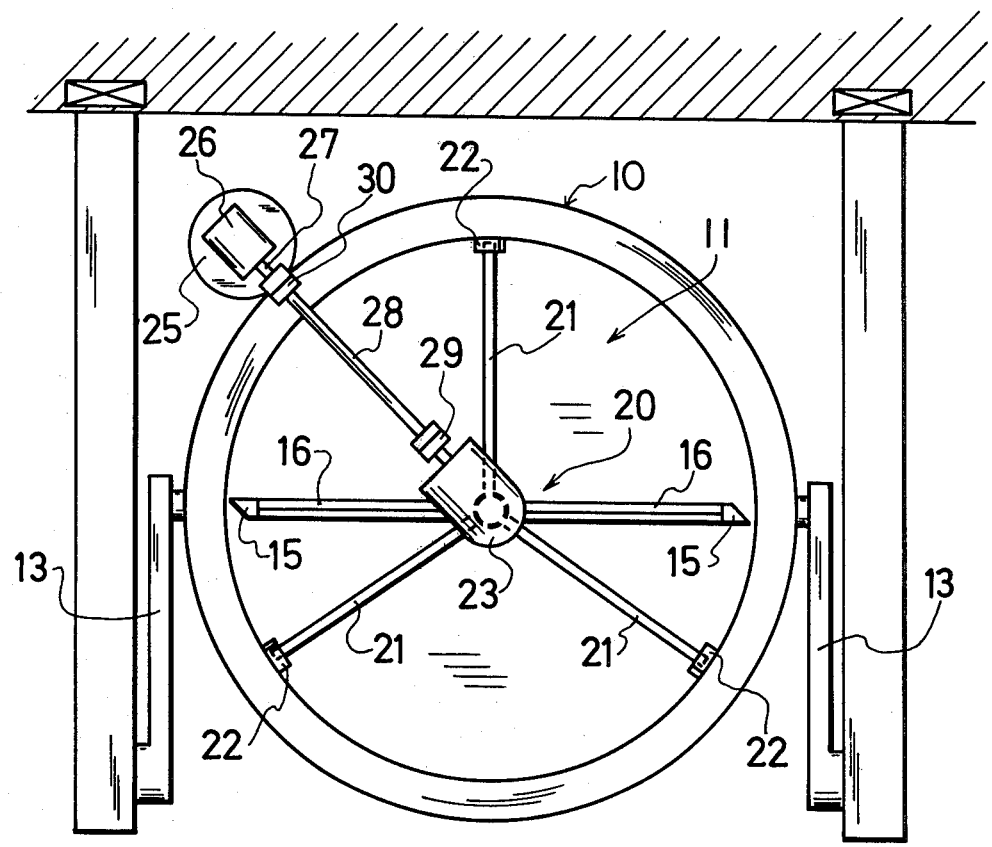
FIG. 1 is a top plan view showing a large scale kitchen cooking apparatus provided with a stirring device according to the invention with the lid removed.
Figure 2:
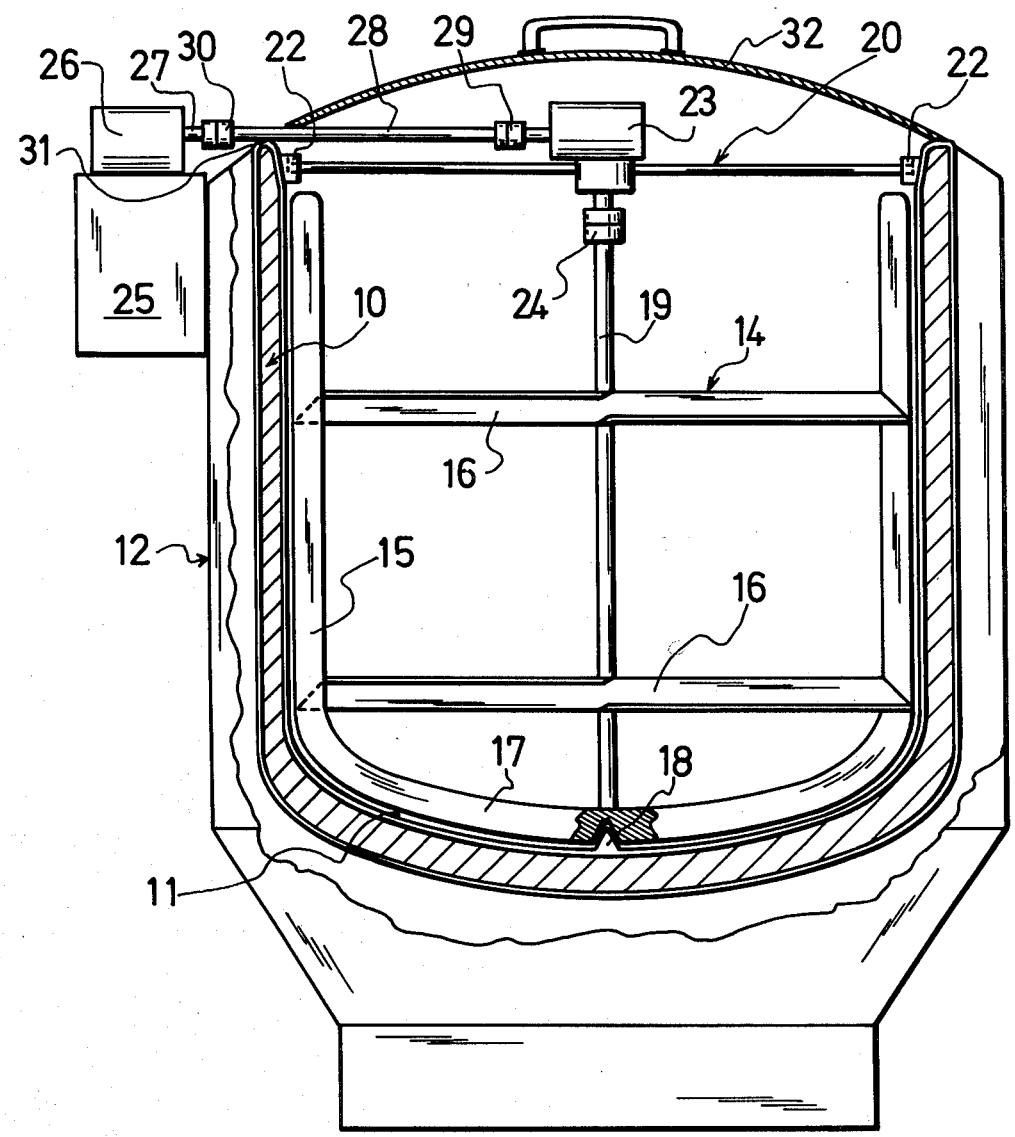
FIG. 2 is a vertical cross-sectional view through the cooking apparatus of FIG. 1.

A cooking apparatus 10 provided with a smoothly vaulted bottom 11 is surrounded by a heating jacket 12, and is supported by arms 13 in such a manner that it may be lifted and if necessary tilted for pouring out the contents thereof.

A stirring device 14 consists of a U-shaped frame 15, the contour of which corresponds to the internal shape of the cooking apparatus, and which is provided with two horizontal cross rods 16. The lower bar 17 of the frame is provided with a recess corresponding to a conical center stud 18 at the bottom of the cooking apparatus, and which guides the lower part of the stirring device.

The stirring device has a vertical central shaft 19, the upper part of which is guided by supporting truss 20. In the embodiment shown this has three arms 21, which are easily mountable to the internal wall of the cooking appliance by bayonet-couplings 22, just below the top edge of the cooking appliance.

The hub of the supporting cross 20 is formed as an angular gear 23, to which the central shaft 19 is connectable by a quick coupling 24. This angular gearing is designed to increase, to maintain, or reduce the rotational speed of the horizontal shaft.

For driving the stirring device there is an electric motor 25 fixedly attached on the outside of the heating jacket, and provided with a vertically oriented shaft (not shown) connected to a primary gear assembly 26 where the necessary speed reduction takes place and which has a horizontal output stud shaft 27. A horizontal shaft 28 is connectable to the two gearings 23 and 26, respectively by quick couplings 29 and 30. The shaft 28 extends immediately above the top edge 31 of the cooking appliance, and the pairs of the stirring device and the mechanism located inside the cooking apparatus do not prevent the use of a cover 32, where one is desired. The cover is provided with a recess fitting the shaft 28. Depending upon the size of the cooking apparatus the cover may be designed to be lifted on to, and off the cooking apparatus manually, or may be supported in a hinge and operated by means of a suitable mechanism. When pouring out the contents of the cooking appliance the mechanism and the stirring device remain on the apparatus, and are not effected by the tilting thereof.

The cross bars 16 may be given a propeller blade shaped form, so that the mass in the cooking apparatus is worked in a suitable manner. Dependent upon the type of the material the stirring device may be given a shape differing from the basic shape shown in the drawing. The size and the shape of the vessel may also vary in view of the field of use, e.g. several chemical products require a stirring intensity different from porridge and dough.

What we claim is:

1. A vessel provided with a stirring device for stirring contents charged in the vessel comprising, a bowl shaped container open at the top, tiltable support means operatively connected to said container to support said container upright and tilt said container for pouring the contents therefrom, and a stirring device comprising a stirrer having a central shaft extending into said container from the top thereof substantially parallel with respect to the geometric central axis of said container, and agitators attached to said central shaft to stir the contents of the container when said shaft is rotated about its longitudinal axis, a fixed conical stud at the bottom of said container, a substantially conical recess in the bottom of said stirrer operatively and removably engaging said stud so that said stud rotatably supports said stirrer, a truss structure having radial arms, detachable connectors for connecting the radially outer ends of said truss arms adjacent the upper edge of said container, a first angular gearing supported on said truss structure adjacent the upper end of said central shaft, a stud shaft operatively connected to said angular gearing and extending substantially parallel to said central shaft, quick coupling means interconnecting said stud shaft and the upper end of said central shaft, a radially extending stud shaft operatively connected to said angular gearing, a radial drive shaft extending from adjacent the outer end of said radial stud shaft to a position adjacent the outer top edge of said container, a quick connect coupling interconnecting said radial stud shaft and the radially inner end of said radial drive shaft, a drive motor mounted on the outer side of said container adjacent the radially outer end of said radial drive shaft and having an output shaft extending substantially perpendicular to said radial drive shaft, a second angular gearing operatively connected to said output shaft and having a stud shaft extending substantially radially to a position adjacent the radially outer end of said radial drive shaft, and a quick coupling means interconnecting said outer end of said radial drive shaft and the adjacent end of said stud shaft of said second angular gearing, so that said container can be tilted while simultaneously operating said stirrer by said drive motor.

2. The vessel according to claim 1 and further comprising a removable lid fitting the upper edge of said container, and having a recess in the outer edge thereof to accommodate the passage of said radial shaft therethrough.

* * * * *